C. B. SCHOENMEHL.
PRIMARY BATTERY.
APPLICATION FILED APR. 23, 1912.

1,055,560.

Patented Mar. 11, 1913.

Witnesses

Inventor
Charles B. Schoenmehl
By Chamberlain & Newman
Attorneys

UNITED STATES PATENT OFFICE.

CHARLES B. SCHOENMEHL, OF WATERBURY, CONNECTICUT.

PRIMARY BATTERY.

1,055,560.   Specification of Letters Patent.   Patented Mar. 11, 1913.

Application filed April 23, 1912. Serial No. 692,737.

*To all whom it may concern:*

Be it known that I, CHARLES B. SCHOENMEHL, citizen of the United States, and resident of Waterbury, in the county of New Haven and State of Connecticut, have invented certain new and useful Improvements in Primary Batteries, of which the following is a specification.

This invention refers to galvanic batteries of the oxid and zinc couple type and in a measure relates to improvements on that form of battery shown and described in my prior Patents Nos. 664,007 and 664,008. This type of battery therefore includes a negative electrode formed of loose oxid of copper scale contained in a perforated flat form of receptacle and employed in conjunction with a pair of zinc plate electrodes, the two being insulatively connected and supported by a suitable suspending rod from the cover of the battery jar.

A further feature of my invention is to support the oxid in a flat form of inclosed and portable receptacle that is made of perforated sheet metal, and in which is contained a corrugated or otherwise irregular form of perforated sheet metal conducting plate whereby a greater internal area of metal surface is brought into contact with the metal oxid, to obtain an increased amount of conducting surface; to so construct and proportion the receptacle that it may be employed in a suitable hanger or frame between the zinc plates in substantially the same manner that the present commercial forms of compressed copper oxid plates are used and supported by a single suspending rod from the cover of a jar.

Figure 1:
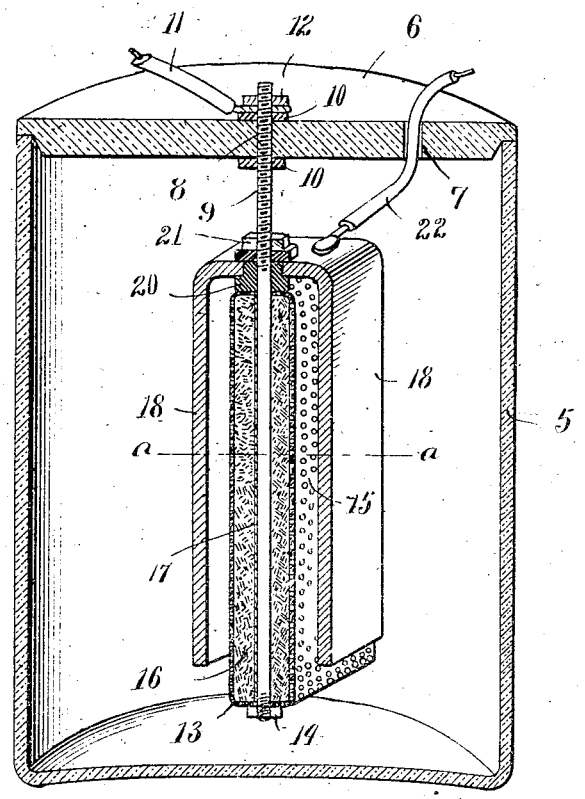
Figure 2:
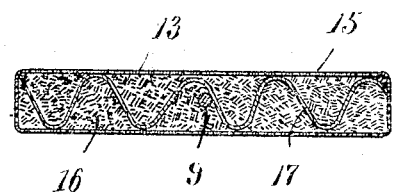
Figure 3:
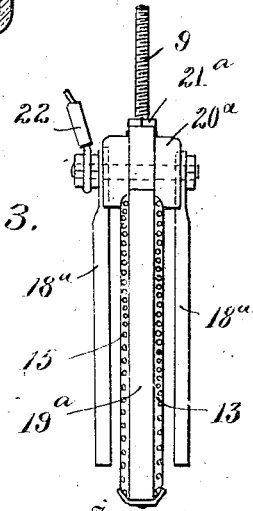

Having the above objects in mind the invention includes the novel features of construction and arrangement of parts hereinafter referred, shown upon the accompanying drawings forming a part of this specification, in which similar characters of reference denote like or corresponding parts throughout the several figures and of which, Figure 1, shows a perspective sectional view of my improved form of negative battery electrode coupled with a zinc electrode and contained within a battery jar. Fig. 2, is a cross sectional view taken on line *a—a* of Fig. 1, of my improved form of negative electrode detached, and, Fig. 3, is an edge view of a modified form of the same negative electrode supported in a different frame and coupled with different styles of zinc plates.

Referring in detail to the characters of reference marked upon the drawings 5 represents a battery jar, 6 the cover, 7 and 8 holes therethrough for the connection and support of the electrodes.

9 represents a suspending rod by means of which the assembled electrodes are hung from the battery cover and detachably connected thereto by means of nuts 10 10. A field wire 11 is also connected to the outer end of this rod by means of a third nut 12 as shown in Fig. 1. In Figs. 1 and 2 the supporting rod is shown connected directly to the negative electrode 13 by being extended centrally and vertically therethrough, and having a nut or head 14 upon its lower end, that fits against the under side of the negative electrode in a manner to support the same.

The special form and construction of negative electrode as contained in this application constitutes the essential feature of the invention when used in the manner and form herein shown, and as will be noted includes a substantially flat shaped perforated covered receptacle 15 filled with loose oxid of copper scale 16 that constitutes the negative material of the electrode and which is penetrable from all sides by the solution contained within the jar. I also provide means for increasing the amount of metal surface for engagement with the oxid by the employment of an internally arranged corrugated sheet metal member 17, the pockets of which are preferably arranged vertically as shown in Fig. 2 to permit the receptacle to be filled from the top end. This contact sheet may also be perforated and in practice would be preferably arranged in contact with some portions of the side walls of the basket and likewise with the suspending rod 9 as shown in Fig. 2. This contact sheet is inserted in the receptacle prior to its being filled with the copper scale and before it is closed together. The particular manner of forming the receptacle is somewhat immaterial, but in practice would probably be made of a single piece with the connected edge portions suitably seamed as is common in sheet metal work of this class. An electrode made in this way may be assembled and used in connection with a bent form of zinc 18 as shown in Fig. 1 or be supported from a short hanger rod 9 as shown in Fig. 3, and used in connection with a metal frame 19ᵃ, a porcelain block 20ᵃ and a pair of zinc plates 18ᵃ—18ᵃ in substantially the same manner that I use a compressed plate.

In Fig. 1 the insulating washer 20 is threaded upon the rod 9 and supported upon the negative electrode 13 in a way to support the before mentioned positive electrode 18 which is further retained in position by means of a nut 21ᵃ and whereby the one electrode is suitably spaced and rigidly supported with relation to the other. In Fig. 3, the negative electrode is provided with a metal frame member 19ᵃ that encircles the edge portion of the receptacle and to which an insulating block 20ᵃ is connected. The positive plates 18ᵃ are in turn bolted to this insulating block in a way to rigidly support the same. The second field wire 22 is connected to the positive plates and is extended out through the hole 7 of the cover of the jar.

Having thus described my invention what I claim and desire to secure by Letters Patent is:—

1. In a primary battery of the class described, the combination of a flat form of negative electrode comprising a perforated sheet metal container, a single suspending rod extending through the container for supporting the same, a filling of loose oxid of copper within the container, a corrugated perforated metal sheet arranged in the oxid of the container, zinc electrodes insulatively supported upon the container and extending down opposite the two side portions of the negative electrode.

2. In a primary battery of the class described, the combination of a flat form of negative electrode comprising a perforated sheet metal container, a single suspending rod extending through the container for supporting the same, a filling of loose oxid of copper within the container, a corrugated perforated metal sheet in engagement with the walls of the container and suspending rod arranged in the oxid of the container, zinc electrodes insulatively supported upon the container and extending down opposite the two side portions of the negative electrode.

Signed at Bridgeport in the county of Fairfield and State of Connecticut this 22nd day of April A. D., 1912.

CHARLES B. SCHOENMEHL.

Witnesses:
C. M. NEWMAN,
RUTH M. NORDEN.